F. J. SCHWABLE.
APPARATUS FOR SEPARATING LIQUID FROM SOLID MATTER.
APPLICATION FILED JULY 16, 1917.
1,308,918. Patented July 8, 1919.
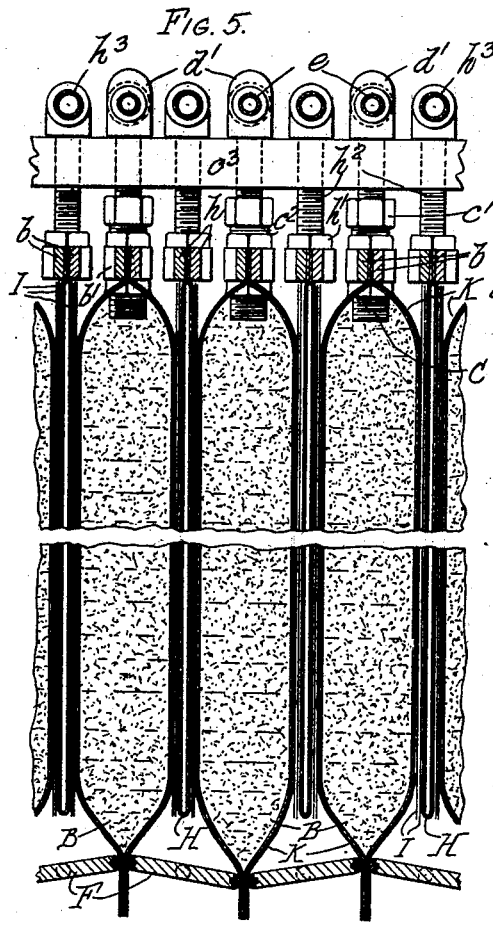
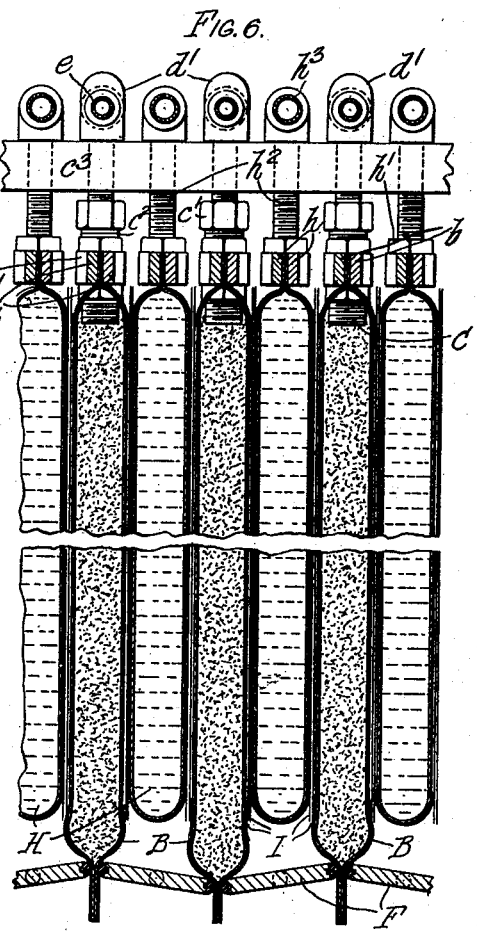
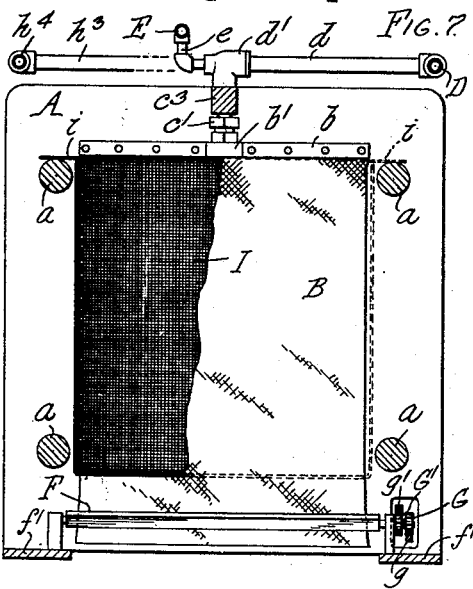
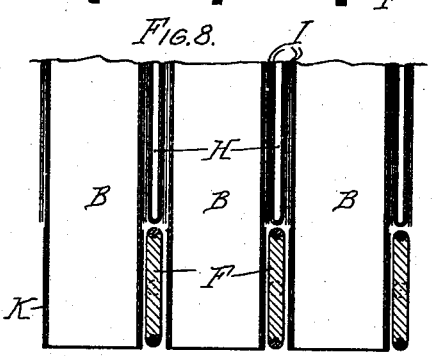
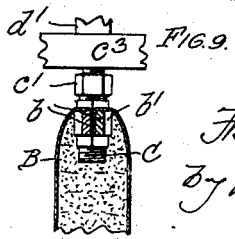

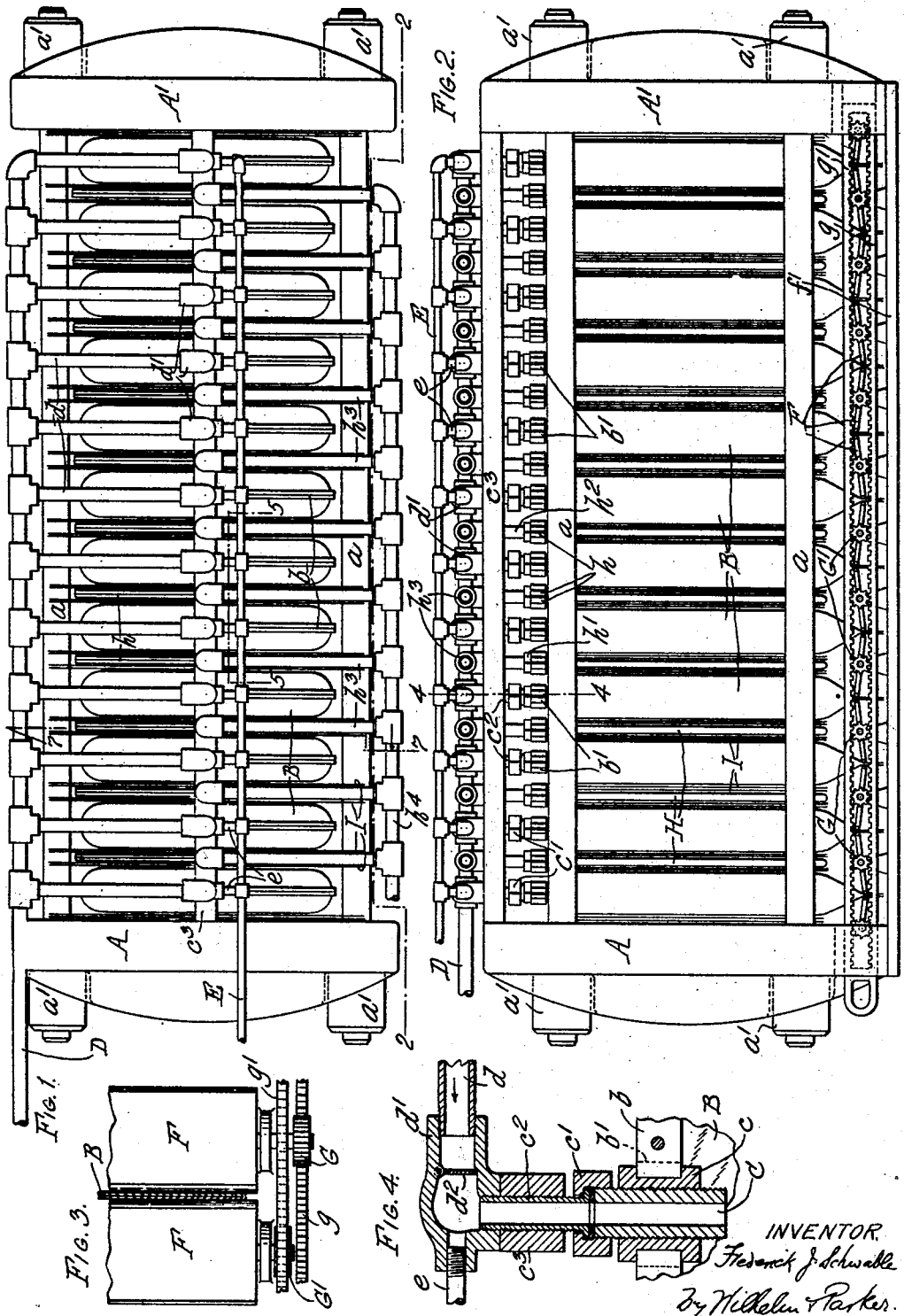

UNITED STATES PATENT OFFICE.

FREDERICK J. SCHWABLE, OF PIQUA, OHIO, ASSIGNOR TO THE FRENCH OIL MILL MACHINERY CO., OF PIQUA, OHIO.

APPARATUS FOR SEPARATING LIQUID FROM SOLID MATTER.

1,308,918.  Specification of Letters Patent.  Patented July 8, 1919.

Application filed July 16, 1917. Serial No. 180,718.

*To all whom it may concern:*

Be it known that I, FREDERICK J. SCHWABLE, a citizen of the United States, residing at Piqua, in the county of Miami and State of Ohio, have invented a new and useful Improvement in Apparatus for Separating Liquid from Solid Matter, of which the following is a specification.

This invention relates to apparatus for separating solid matter from liquids containing a comparatively small percentage of solid matter. The press or apparatus is primarily designed for separating a large percentage of the liquid from the sewage sludge leaving the solid matter thereof in a condition suitable for drying by a subsequent operation, but it is not intended to limit the invention to this use since the invention may be used for separating solid matter from other liquids or more or less liquid materials which contain a comparatively small percentage of solid matter.

The objects of the invention are to produce an apparatus of this kind of comparatively simple and inexpensive construction by which large quantities of material can be treated rapidly and efficiently with the minimum expense and labor; also to provide an apparatus of this kind in which a large percentage of liquid is separated from the solid matter by the pressure which forces the liquid into the apparatus before external pressure is applied to remove further liquid from the remaining material; also to provide means whereby the solid matter can be easily and expeditiously removed from the separating containers of the apparatus; also to provide means of improved construction for charging the press; also to improve apparatus of this kind in other respects hereinafter specified:—

In the accompanying drawings:

Figure 1 is a plan view of an apparatus embodying the invention for separating solid matter from liquids.

Fig. 2 is a side elevation thereof, partly in section, on line 2—2, Fig. 1.

Fig. 3 is a fragmentary plan view, partly in section thereof, on an enlarged scale, showing the mechanism for opening and closing the walls of the separating containers for the material.

Fig. 4 is a fragmentary transverse sectional elevation thereof on an enlarged scale, on line 4—4, Fig. 2, showing the inlet fitting of one of the separating containers.

Figs. 5 and 6 are fragmentary longitudinal sectional elevations thereof on an enlarged scale, on line 5—5, Fig. 1, showing the separating containers respectively before and after external pressure has been applied thereto.

Fig. 7 is a transverse sectional elevation thereof on line 7—7, Fig. 1.

Fig. 8 is a fragmentary longitudinal sectional elevation on an enlarged scale, showing the lower ends of the separating containers open to discharge the solid matter therefrom.

Fig. 9 is a fragmentary section of one of the separating bags, showing the same turned inside out.

Briefly stated, the apparatus embodying the invention shown in the drawings includes a frame having relatively fixed end walls between which are arranged a plurality of upright or suspended compressible bags or containers made of pervious material such, for example, as canvas, and into which the sludge is pumped through suitable pipes. The pressure with which the sludge is pumped into the separating bags or containers serves to force a considerable amount of liquid through the walls of the containers or bags, leaving the solid matter in the bags. Compression bags or devices are arranged between the separating bags or containers and are adapted to be expanded by pneumatic or hydraulic pressure, thus applying pressure to the separating bags or containers and separating additional liquid from the contents thereof. The apparatus is preferably also provided with means whereby the lower ends of the separating bags or containers are normally closed but can be opened to permit the solid matter to be quickly and easily discharged therefrom.

The frame of the press may be of any suitable construction, that shown comprising relatively fixed end walls or heads A A' which are connected by suitable tie rods $a$ arranged adjacent to the four corners of the end walls or heads and held in place by suitable means such as nuts $a'$ engaging the outer faces of the heads. A frame of any other suitable construction adapted to resist the pressure against the end walls thereof may be employed.

B represents separating containers or bags which are suspended or supported in upright position at intervals between the heads A A' of the frame which confine the containers and form pressure abutments therefor. These containers may be of any suitable shape or material, those shown in the drawings being substantially square and made of canvas or other material pervious to liquid. The lower ends of the separating bags are open and are adapted to be closed by mechanism hereinafter to be described, and the upper ends of the bags are closed, as for instance by means of securing or clamping strips $b$ which press the walls of the upper end of each bag together to close the same and which are provided with rounded portions $b'$ through which inlet pipes for the material to be separated extend. The inlet pipes may be of any suitable kind, those shown each comprising a short pipe section C which is screwed into a nut or threaded sleeve $c$ which is held by the rounded portions $b'$ of the clamping strips $b$. The pipe C is connected by means of a coupling $c'$ to a pipe or nipple $c^2$ suitably secured in a longitudinal supporting member $c^3$ which is mounted on the frame of the apparatus and from which the separating bags are suspended by means of the inlet pipes.

The material to be separated is, in the construction shown, admitted to the inlet pipes C of the separating bags by means of a pipe D extending lengthwise of the apparatus and having a plurality of branch pipes $d$ leading to a fitting or elbow $d'$ which is preferably provided with a check valve $d^2$ to prevent the return flow of sludge from the containers to the pipe D. The elbows $d'$ are shown as being connected with an air supply pipe E by means of a plurality of branch pipes $e$ extending into the elbows. The pipes D and E or their branch pipes are provided with cocks (not shown) for controlling the discharge from these pipes.

Suitable means are provided for opening and closing the lower ends of the separating bags or containers D, such means shown in the construction illustrated comprising a plurality of shutter plates or members F extending transversely of the apparatus between the lower ends of the separating bags or containers and journaled at their ends in suitable bearings on longitudinal frame members $f'$. The shutter plates are adapted to be swung into substantially upright positions for opening the bottoms of the separating containers, as shown in Fig. 8 and into substantially horizontal positions as shown in Figs. 2, 5 and 6, in which positions the lower end of each bag is clamped between the adjacent edges of the plates on opposite sides of the bag, the lower ends of the several bags being thus closed. Any suitable means may be employed for swinging or rocking the closing plates or members, those shown including pinions G G' mounted on the journals of the plates or members and adapted to mesh respectively with rack bars $g\ g'$ which are preferably rigidly connected and arranged to slide lengthwise of the apparatus. The pinions G G' are arranged alternately in different planes and the alternate pinions G mesh with one rack $g$ while the remaining pinions G' mesh with the other rack $g'$ in such a manner that the movement of the two rack bars in one direction will swing alternate shutter bars in opposite directions to pinch the bottoms of the bags or containers for closing the same. When the lower ends of the bags or containers are closed, as shown in Figs. 2, 5 and 6, the solid matter is confined in the bags while the liquid is adapted to escape through the interstices or pores in the walls of the bags. When it is desired to empty the solid matter from the bags the plates F are swung into their upright positions, thus permitting the lower ends of the bags to open and the solid matter to drop out of the bags.

External pressure is preferably applied to the separating containers or bags by means of compression devices, containers or bags H which are placed between the separating bags and which are preferably made of flexible, impervious material and are adapted to be expanded by means of pneumatic or hydraulic pressure. In the construction shown the compression devices or bags are preferably also substantially square and are closed except at their upper ends. The upper ends of the compression devices or bags are closed in the same manner as the separating bags, namely, by means of two clamping plates or strips $h$ secured together at opposite sides of the upper portion of each pressure device or bag and provided with a nut or sleeve $h'$ through which a pipe $h^2$ extends. The upper ends of the pipes $h^2$ are connected to a plurality of branch pipes $h^3$ which connect with a main pressure pipe $h^4$. Any desired pressure medium may be employed for expanding the compression bags. Hot water is preferably used if the material to be separated is greasy, since the hot water serves to keep the grease warm and in a fluid condition, thus lessening the tendency for the grease to close the interstices of the separating bags or containers. Suitable cocks or valves (not shown) are of course provided for supplying and discharging the pressure medium to apply and relieve the pressure on the separating bags or containers as required.

Any suitable means may be inserted between the adjacent walls of the separating bags and the compression bags for permitting the draining of liquid from the separating bags, screens or mats I of woven wire or the like being shown for this purpose in the construction illustrated. These are supported in the construction shown by lateral projections $i$ on the upper ends of the screens resting on the upper connecting rods $a$ of the frame.

In the operation of the apparatus the lower ends of the separating bags or containers are first closed by means of the shutter plates F and the material to be separated is then pumped into the separating bags or containers. The material to be separated can be pumped under sufficient pressure to cause a large percentage of the liquid to pass through the walls of the separating bags. When a considerable quantity of solid matter has collected within the separating bags the pressure medium is admitted to the compression bags H, causing the same to be expanded and expressing additional liquid from the contents of the separating bags. The heads A A' confine the containers and compression bags and limit the expansion thereof so that when the compression bags are expanded the containers are subjected to pressure without displacement. When sufficient liquid has been removed from the contents of the separating bags, the pressure on the compression bags is relieved and the shutter members F are turned into substantially upright positions, thus allowing the lower ends of the separating containers to open. Compressed air or other fluid pressure can then be admitted through the pipe E into the separating bags for discharging the matter contained therein through the open lower ends of these bags. The admission of air under pressure into the separating bags causes the walls thereof to separate from the matter contained therein and thus causes the solid material to drop out. The apparatus is then ready to receive another charge of material to be separated.

The apparatus shown is very efficient for handling matter containing a large percentage of liquid and has the advantage that the separating bags or containers are subjected to a comparatively small amount of movement when the same are compressed and remain in substantially fixed positions. This structure also enables the separating containers to be readily filled and emptied with the minimum amount of labor and when used for separating the solid matter from sewage sludge, the apparatus removes sufficient water from the solid matter so that the matter discharged from the separating bags can be readily dried in suitable kilns.

The described connections of the separating bags with the sludge supply pipes, enables the bags to be readily disconnected by loosening the couplings $c'$. The bags can then be turned inside out and used in this condition by connecting the pipe sections C to the nipper ends of the pipe sections C to the nipples $c^2$. Thus, after the bags have been used with one surface outermost and the inner surfaces become caked or clogged with material, they can be turned inside out so that the flow of liquid will be reversed through the walls of the bags and will act to clean the bags. The more exposed portions of the separating bags can be reinforced or made of stronger material, as indicated at K to prevent the rupture of these portions by the pressure to which these bags are subjected.

Provision is preferably made for collecting and draining off the separating liquid and also for receiving and conveying away the solid matter discharged from the separating bags or containers, but these features do not form any part of this invention and are not herein shown.

I claim as my invention:—

1. In an apparatus for separating solid matter from liquids, the combination of a plurality of upright separating containers having movable walls and open lower ends and having provision for filling the containers, means for supporting said containers in upright position, means for closing the lower ends of said containers, expansible compression devices arranged between adjacent containers, means for confining said containers and compression devices, and means for expanding said compression devices to compress the contents of said containers, said closing means being operable to close and open the lower ends of said separating containers without disturbing the supporting means for the containers.

2. In an apparatus for separating solid matter from liquids, the combination of a plurality of upright compressible separating containers having pervious walls and open lower ends and having provision for filling the containers, means for supporting said containers in upright position, means for closing the lower ends of said containers, expansible compression devices arranged between adjacent containers, means for confining said containers and compression devices, and means for expanding said compression devices to compress said containers and express liquid from the contents thereof, said closing means being operable to close and open the lower ends of said separating containers without disturbing the supporting means for the containers.

3. In an apparatus for separating solid matter from liquids, the combination of a plurality of separating bags of pervious material suspended with their open ends downward and having provision for filling the bags, means for closing the lower ends of the bags, expansible compression devices arranged between adjacent bags, means for confining said bags and compression devices, and means for expanding said compression devices to compress said bags and express liquid from the contents thereof.

4. In an apparatus for separating solid matter from liquids, the combination of a plurality of separating bags of pervious material suspended with their open ends downward and having provision for filling the bags, means for closing the lower ends of the bags, bags of impervious material arranged between adjacent separating bags, means for confining said bags, and means for expanding said impervious bags for expressing liquid from the contents of said separating bags.

5. In an apparatus for separating solid matter from liquids, the combination of a plurality of separating containers having movable walls and having provision for filling the containers, expansible compression devices arranged between adjacent containers, means for confining said containers and compression devices, and means for expanding said compression devices to compress the contents of said containers, said separating containers having parts adapted to be opened while said containers remain in said confining means to discharge the solid matter from said containers.

6. In an apparatus for separating solid matter from liquids, the combination of a plurality of upright separating containers having movable walls and open lower ends and having provision for filling the containers, means for supporting said containers in upright position, means for closing the lower ends of said containers, expansible compression devices arranged between adjacent containers, means for confining said containers and compression devices, means for expanding said compression devices to compress the contents of said containers, said closing means being operable to close and open the lower ends of said separating containers without disturbing the supporting means for the containers, and means for discharging the contents from said separating containers.

7. In an apparatus for separating solid matter from liquids, the combination of a plurality of separating bags of pervious material suspended with their open ends downward and having provision for filling the bags, means for closing the lower ends of the bags, bags of impervious material arranged between adjacent separating bags, means for confining said bags, means for introducing the material to be separated under pressure into said separating bags and for driving a part of the liquid through the pervious walls of said bags, and means for expanding said impervious bags to express additional liquid from the contents of said separating bags.

8. In an apparatus for separating solid matter from liquids, the combination of a plurality of separating bags of pervious material having provision for filling the bags, said bags being open at one end thereof, means for clamping together the walls of each bag for closing the open ends of said bags, means for causing the contents to discharge from said bags through the open ends thereof, and compression devices arranged between adjacent bags for expressing liquid from the contents of said bags.

9. In an apparatus for separating solid matter from liquids, the combination of a plurality of separating bags of pervious material having inlet openings through which the liquid is admitted to said bags, and discharge openings adapted to be closed for confining the contents in said bags and to be opened to discharge the contents therefrom, compression devices between adjacent bags for expressing liquid from the contents of said bags, and means for admitting fluid pressure into said bags for discharging material therefrom.

10. In an apparatus for separating solid matter from liquids, the combination of a plurality of separating bags of pervious material having inlet openings through which the liquid is admitted to said bags, and discharge openings adapted to be closed for confining the contents in said bags and to be opened to discharge the contents therefrom, compression bags arranged between adjacent separating bags, means for expanding said compression bags for expressing liquid from the contents of said separating bags, and means for admitting compressed air to said separating bags to discharge the material therefrom.

11. In an apparatus for separating solid matter from liquids, the combination of a plurality of separating bags of pervious material suspended with their open ends downward and having provision for filling the bags, means for closing the open ends of the bags, bags of impervious material arranged between adjacent separating bags, drain plates arranged between said separating and compression bags through which the liquid expressed from the contents of said separating bags can escape, and means for confining said bags.

12. In an apparatus for separating solid matter from liquids, the combination of a plurality of separating bags of pervious material having provision for filling the bags, bags of impervious material arranged between adjacent separating bags, means for confining said bags, means for suspending said bags in said confining means with the open ends of the bags downward, means for closing the open ends of the bags, and means for expanding said impervious bags to express liquid from the contents of said separating bags.

13. In an apparatus for separating solid matter from liquids, the combination of a plurality of separating bags of pervious material suspended with their open ends downward and having provision for filling the bags, means for closing the open ends of the bags, expansible compression devices arranged between adjacent bags, a frame for confining said bags and compression devices, fittings for admitting the material to be separated to said separating bags, said fittings being secured on said frame to suspend said bags therefrom, and means for expanding said compression devices.

14. In an apparatus for separating solid matter from liquids, the combination of a plurality of separating bags of pervious material having provision for filling the bags, expansible compression devices arranged between adjacent bags, a frame for confining said bags and compression devices, fittings for admitting the material to be separated to said separating bags, said fittings being secured on said frame to suspend said bags therefrom, means for expanding said compression devices, and means for causing the solid matter to discharge from the bottoms of said separating bags.

15. In an apparatus for separating solid matter from liquids, the combination of a plurality of separating bags of pervious material suspended with their open ends downward and having provision for filling the bags, means for closing the open lower ends of the bags, expansible compression devices arranged between adjacent bags, a frame for confining said bags and compression devices, fittings for admitting the material to be separated to said separating bags, and fittings for admitting expanding medium to said compression devices, the fittings being secured on said frame for suspending said separating bags and said compression devices on said frame.

16. In an apparatus for separating solid matter from liquids, the combination of a plurality of bags of pervious material having open ends, means for suspending said bags in substantially fixed position with their open ends downward, means operable to close and permit the opening of the lower ends only of the bags, means for filling the bags, and compression devices arranged between adjacent bags and operable for compressing the contents of said bags.

17. In an apparatus for separating solid matter from liquids, the combination of a plurality of bags of pervious material having open ends, means for suspending said bags in substantially fixed position with their open ends downward, clamping devices arranged between said bags and operable to clamp and release the lower ends only of the bags for closing and permitting the opening of the same, means for filling the bags, and compression means operable for compressing the contents of the bags.

18. In an apparatus for separating solid matter from liquids, the combination of a plurality of bags of pervious material each having one open end, said bags being adapted to be turned inside out, liquid supply pipes for filling said bags, means for connecting said bags to said supply pipes with either side thereof outermost, means for closing the open ends of the bags, and means for compressing the contents of the bags.

19. In an apparatus for separating solid matter from liquids, the combination of a plurality of bags of pervious material having open ends, means for suspending said bags in substantially fixed position with their open ends downward, pivoted clamping plates arranged between the lower end portions of said bags and movable to clamp and release the lower ends of the bags for closing and permitting the opening of the same, means for filling the bags, and compression means operable for compressing the contents of the bags.

Witness my hand this 11th day of July, 1917.

FREDERICK J. SCHWABLE.

Witnesses:
C. B. UPTON,
A. B. BINFORD.